UNITED STATES PATENT OFFICE.

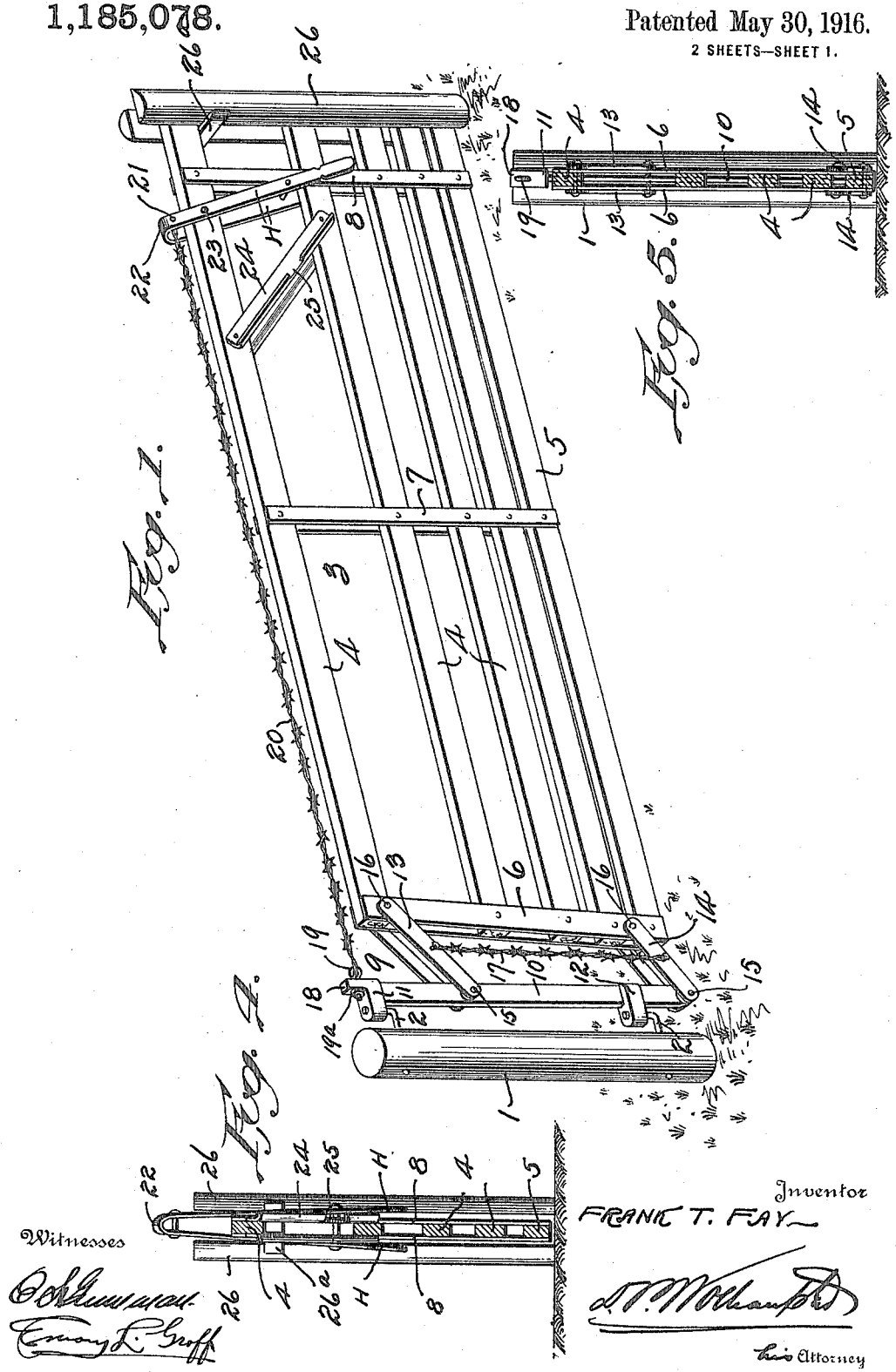

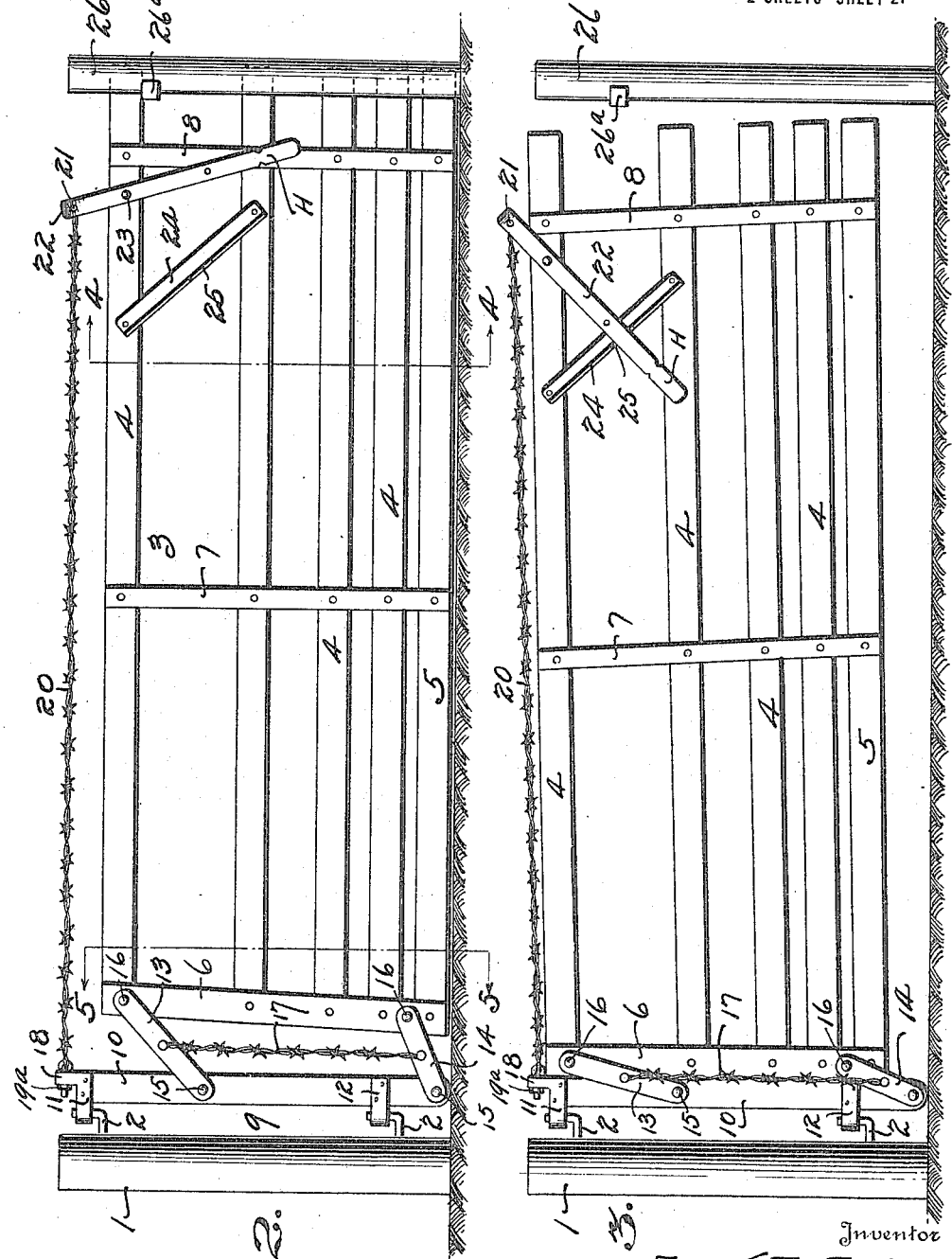

FRANK TOMPHSON FAY, OF WOODHULL, ILLINOIS.

GATE.

1,185,078.     Specification of Letters Patent.     Patented May 30, 1916.

Application filed February 4, 1915. Serial No. 6,122.

*To all whom it may concern:*

Be it known that I, FRANK T. FAY, a citizen of the United States, residing at Woodhull, in the county of Henry and State of Illinois, have invented certain new and useful Improvements in Gates, of which the following is a specification.

This invention relates to the general subject of gates, and more particularly to gates of that type which are especially adapted for use in connection with stock inclosures and the like.

To meet all conditions of use, it is essential that a gate of this character be so constructed that small live stock cannot crawl underneath the same, and in meeting this requirement by bringing the lower side of the gate in close contact with the ground or floor, other difficulties have been encountered.
That is to say, ordinarily a gate which is hung close enough to the ground to prevent the escape of small live stock, is difficult, if not impossible, to operate over rough or uneven ground, or when the earth is covered with snow and ice.

Accordingly, in order to remedy the above objections the present invention contemplates a simple and reliable gate construction which will not only fulfil all of the requirements of a stock inclosure, but which can also be easily manipulated under all conditions.

Primarily the invention has in view a gate construction which rests upon the ground in its normal closed position, and which may be easily and readily raised and lifted out of contact with the earth or floor, and swung on its hinge element in the usual manner by the manipulation of a single lever device.

Another object of the invention is to provide a gate which is automatically locked and unlocked by the same operation which either raises or lowers the gate. That is to say, the same manual act which raises the gate releases it from its fastenings so that it may freely swing in the ordinary manner, and vice versa, the gate becomes automatically fastened by the same movement which causes it to be lowered. This feature is of much practical importance since it not only facilitates the operation of the gate, but does away with a special or separate lock.

Another object of the invention is to provide a novel and substantial construction which may be easily and economically made and utilized to a practical advantage in connection with stock pens, field fences, and similar constructions where strength, rigidity, and durability are required.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a perspective view of my improved gate construction. Fig. 2 is a front elevation of the construction shown in Fig. 1, showing the gate in its normal closed position. Fig. 3 is a view similar to Fig. 2 showing the gate in raised position. Fig. 4 is a detail sectional view on the line 4—4 of Fig. 2. Fig. 5 is a view similar to Fig. 4 on the line 5—5 of Fig. 2.

Similar reference characters designate corresponding parts throughout the several figures of the drawings.

In carrying out the invention, it is proposed to utilize any of the well known materials adapted for this general purpose, such for instance as wood, channeled or bar metal, or stock wire, though for the purposes of illustration, the gate in the drawing is shown as being constructed of frame material with suitable metal reinforcing elements and accessories. Accordingly, it will be apparent from the several figures of the drawings that the reference numeral 1 designates a stationary gate or hinge post, preferably embedded in the ground in the well known manner and provided with the angular pintle members 2 upon which my improved gate designated in its entirety by the reference 3 is hinged. The said gate 3 preferably includes a plurality of frame bars 4 which are arranged so that the space between the lower bars is less than the upper ones for the purpose of preventing the escape of small live stock, and furthermore in this connection, it will be observed that the lowermost bar 5 is normally in contact with the ground or other surface G. The several individual frame bars are held in spaced relation by any suitable arrangement of metal straps or connectors 6, 7, and 8, the said connector or end upright 6 being preferably inclined toward the free end of the gate and secured at the extreme rear end of the gate bars, while the connectors 7 and 8 are respectively an intermediate bar and front end bar.

Though the foregoing description is specific to the particular type of gate shown in the drawing, it will of course be understood that any desired type of gate or gate framework may be substituted so long as it does not depart from the general structural outlines of the gate shown in the drawings.

For the purpose of operatively mounting the gate 3 according to the present invention, it is proposed to utilize a novel and practical type of hinge device 9 which preferably includes an upright rigid hinge bar element 10 having at its upper end a suitable pivot knuckle 11, and spaced a short distance from its lower end another pivot knuckle 12, both of which knuckles are adapted to pivotally engage the pintle members 2 carried by the stationary gate post. This hinge device further includes the upper and lower sets of lifting links 13 and 14 respectively, each set being pivotally connected as at 15 to the swinging hinge bar 10, and also pivotally connected as at 16 with the end upright 6 of the gate.

With further reference to the links elements 13 and 14, it will be observed from the several figures of the drawing that the upper set 13 is longer than the lower set 14 thereby compensating for the forward inclination of the end upright 6 of the gate, making it possible for the said end upright 6 to flushly contact with the edge of the hinge bar 10 when the gate is lifted from the ground as shown in Fig. 3. It will also be observed from this latter figure that this construction causes the upper part of the free end of the gate to swing higher than the hinge end, for the purpose of counteracting the spring of the gate and sag of the gate post. In order to further increase the effectiveness of the gate or preventing the escape of small live stock, the upper and lower sets of links may be connected by a strand or barbed wire 17, and it will be obvious that this connection not only fulfils this requirement, but at the same time aids in distributing the lifting stress between the two sets of links when the gate is lifted.

In connection with the upper hinge knuckle 11, it will be observed that the same is provided with an upstanding arm portion 18 which has secured thereto a suitable eye 19 for the purpose of receiving one end of a gate operating connection 20 whose opposite end is connected as at 21 with a double handle actuating lever 22. For the purpose of making the connection 20 taut where a wire or like element is used as shown, the said bolt 19 is preferably provided with an adjustment nut 19ª, thus preventing any slack or lost motion in the operation of the gate. The said lever 22 is preferably of inverted U-shaped formation, and arranged to straddle the upper gate bar to which it is loosely pivoted as at 23, and provides the handle arms H on opposite sides of the gate so that the same may be conveniently manipulated either from the outside or inside of the stock closure. It will thus be apparent that the raising and lowering of the gate 3 is effected by means of the lever 22 being operatively connected to the rigid hinge bar 10 which is hinged on the gate post, and for the purpose of keeping the gate in its elevated position, there is provided adjacent the lever 22 on each side of the gate a suitable locking bar 24 which is preferably of angle formation and provided in one of its flanges with a keeper notch 25. That is to say, owing to the fact that the pivot 23 is rather loose the handle arms H will slide along the side flange of the locking bar 24 when the lever 22 is swung in a direction to lift the gate, and enter the keeper notch 25 to hold the gate raised, and in order to release the lever from the keeper notch to lower and lock the gate, it is only necessary to push the same so that it rocks slightly on its pivot 23.

With further reference to the operation of the gate it will be noted that the free end thereof is normally engaged within a slotted fastening post 26 and one of the frame bars rests on a fixed latch-piece 26ª carried by said post. When the actuating lever 22 is turned on its pivot 23, and the gate is lifted, the same will become disengaged from the slot and latch-piece of the fastening post and thereby swing entirely clear thereof as well as the ground or other surface upon which the gate normally rests. Also, while the operating connection 20 between the lever 22 and the rigid swinging hinge bar 10 may be in the form of a wire or rod, it is preferably desired to utilize a strand of barbed wire for the purpose of keeping the stock off of the top of the gate.

In connection with the manner of operating the present construction, it will be apparent that the gate 3 is so arranged that it is capable of both horizontal and vertically swinging motion. The vertical motion is produced by the manipulation of the actuating lever 22, and raising the gate from the ground and releasing it from its fastening post, and the swinging motion is made possible through the mounting of the hinge device 9 on the pintle members 2 of the gate post. As above described, it will be apparent that the entire gate may be held in its raised or elevated position, and the hinged device 9 maintained in its collapsed condition so that the gate may have a free swinging motion, by means of the novel locking of the actuating lever 22. Thus, the gate is raised clear of the uneven earth surface, and at the same time automatically unlocked by the simple manipulation of the lever device in one direction, while its manipulation in a reverse direction readily permits the gate to assume its normal position and become automatically locked with the fastening post 26. This construction not only does away with a special and separate locking device, but at the same time forms a strong and effective lock particularly adapted to the use intended.

While the essential features of the invention have been described in connection with the particular construction shown in the drawings, it will of course be understood that various changes in the form, proportion and minor details of construction may be resorted to without departing from the spirit of the invention or the scope of the appended claims.

I claim:

1. In a device of the class described, the combination with a stationary hinge post and a gate, of a hinge device for said gate including a rigid hinge bar pivotally supported by said hinge post, links pivotally engaging said bar and gate, a flexible connection between said links intermediate their ends, a fastening post for detachably receiving the free end of the gate, and an operating wire connecting with the operating end of said lever and the rigid bar of the hinge device for lifting the gate on the links of the hinge device to clear the ground and disengage the fastening post.

2. In a device of the class described, the combination with a stationary hinge post carrying pintle members therewith, of a gate, a hinge device for said gate including a rigid hinge bar supported on said pintle members, links pivotally engaging said bar and gate and having a flexible connection with each other intermediate their ends, a fastening post normally receiving the free end of the gate, a double-handled lever pivotally mounted on the top rail of said gate, an operating connection between the lever and the rigid bar of the hinge device, and a keeper bar having a holding notch located in the path of the swing of the handles of the lever for maintaining said lever in position to keep the gate clear of the ground and disengaged from said fastening post.

In testimony whereof I hereunto affix my signature in the presence of two witnesses.

FRANK TOMPHSON FAY.

Witnesses:
S. H. WHITEAMT,
CHAS. BELL.